United States Patent
Sugita et al.

(10) Patent No.: US 9,748,575 B2
(45) Date of Patent: Aug. 29, 2017

(54) NONAQUEOUS ELECTROLYTE SECONDARY BATTERY

(71) Applicant: Panasonic Corporation, Osaka (JP)

(72) Inventors: Yasunari Sugita, Hyogo (JP); Kazuki Endo, Osaka (JP); Tomoki Shiozaki, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 0 days.

(21) Appl. No.: 14/988,862

(22) Filed: Jan. 6, 2016

(65) Prior Publication Data
US 2016/0254545 A1 Sep. 1, 2016

(30) Foreign Application Priority Data
Feb. 27, 2015 (JP) .................. 2015-038512

(51) Int. Cl.
| | | |
|---|---|---|
| *H01M 4/62* | (2006.01) | |
| *H01M 10/0525* | (2010.01) | |
| *H01M 4/13* | (2010.01) | |
| *H01M 4/66* | (2006.01) | |
| *H01M 10/42* | (2006.01) | |
| *H01M 10/052* | (2010.01) | |

(52) U.S. Cl.
CPC ............... *H01M 4/62* (2013.01); *H01M 4/13* (2013.01); *H01M 4/667* (2013.01); *H01M 10/4235* (2013.01); *H01M 10/052* (2013.01)

(58) Field of Classification Search
CPC .. H01M 4/628; H01M 10/0525; H01M 4/131; H01M 4/0404
See application file for complete search history.

(56) References Cited

U.S. PATENT DOCUMENTS

| | | | |
|---|---|---|---|
| 2007/0148555 A1* | 6/2007 | Fukaya | ............ H01M 10/0569 429/331 |
| 2013/0216899 A1* | 8/2013 | Tsujikawa | ............... H01M 4/62 429/199 |
| 2014/0045028 A1* | 2/2014 | Moon | ............... H01M 10/5004 429/120 |
| 2014/0287378 A1* | 9/2014 | Jensen | ................. A61C 19/004 433/29 |
| 2016/0020467 A1* | 1/2016 | Sugita | .................... H01M 4/13 429/209 |

FOREIGN PATENT DOCUMENTS

| | | |
|---|---|---|
| JP | 2000-149924 | 5/2000 |
| JP | 2009-016106 | 1/2009 |

* cited by examiner

*Primary Examiner* — Muhammad Siddiquee
(74) *Attorney, Agent, or Firm* — McDermott Will & Emery LLP

(57) ABSTRACT

A nonaqueous electrolyte secondary battery includes a positive electrode that includes a positive electrode current collector, an intermediate layer on the positive electrode current collector, and a positive electrode mix layer on the intermediate layer. The intermediate layer contains a flame retardant and a conductive material having a heat conductivity of 10 W/m·K or more.

6 Claims, 2 Drawing Sheets

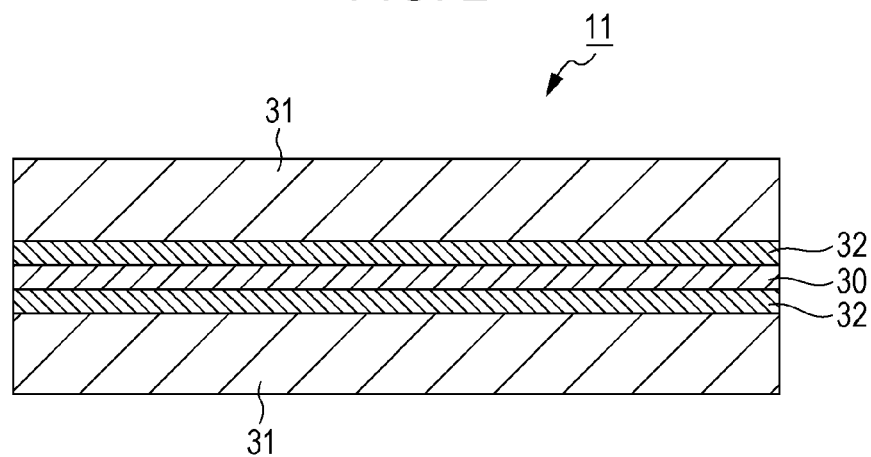

NONAQUEOUS ELECTROLYTE SECONDARY BATTERY

BACKGROUND

1. Technical Field

The present disclosure relates to a nonaqueous electrolyte secondary battery.

2. Description of the Related Art

Japanese Unexamined Patent Application Publication No. 2000-149924 aiming to improve safety in the event of overcharging discloses a nonaqueous electrolyte secondary battery in which an intermediate layer mainly composed of graphite is disposed between a positive electrode mix layer and a positive electrode current collector. Japanese Unexamined Patent Application Publication No. 2009-16106 discloses a nonaqueous electrolyte secondary battery in which a flame retardant is added to a positive electrode mix layer to suppress thermal runaway reactions.

According to the technologies disclosed in these patent documents, the safety of batteries may be improved. However, with respect to internal short-circuiting caused by nail penetration or the like, the battery disclosed in Japanese Unexamined Patent Application Publication No. 2000-149924 may need a further improvement. In particular, high-energy-density batteries generate a large quantity of heat in the event of internal short-circuiting and thus suppressing heat generation and enhancing safety are desirable for such batteries. Adding a flame retardant to a mix layer, as in the battery disclosed in Japanese Unexamined Patent Application Publication No. 2009-16106, degrades output characteristics.

SUMMARY

One non-limiting and exemplary embodiment provides a nonaqueous electrolyte secondary battery that includes a positive electrode, a negative electrode, and a nonaqueous electrolyte. The positive electrode includes a positive electrode current collector, an intermediate layer on the positive electrode current collector, the intermediate layer containing a flame retardant and a conductive material having a heat conductivity of 10 W/m·K or more, and a positive electrode mix layer on the intermediate layer.

The nonaqueous electrolyte secondary battery according to an embodiment of the disclosure suppresses heat generation in the event of internal short-circuiting caused by nail penetration or the like without degrading battery performance such as output characteristics, and safety under abnormal situations such as nail penetration can be further improved.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 2 is a cross-sectional view of a positive electrode according to an exemplary embodiment.

DETAILED DESCRIPTION

Figure 1:
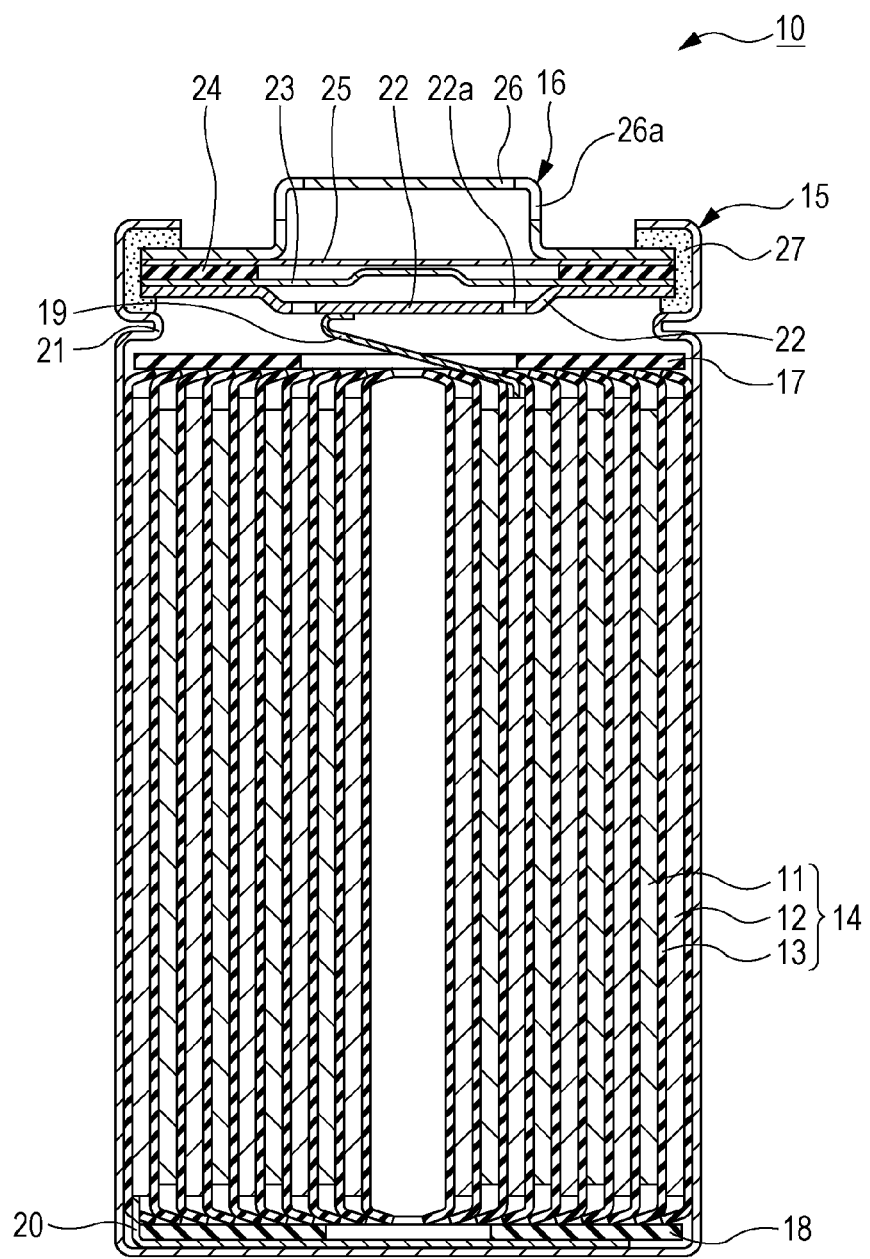
FIG. 1 is a cross-sectional view of a nonaqueous electrolyte secondary battery according to an exemplary embodiment.

Suppressing heat generation in the event of internal short-circuiting caused by nail penetration or the like is desirable for nonaqueous electrolyte secondary batteries. The inventors have conducted extensive studies to further suppress exothermic reactions and improve battery safety without degrading battery characteristics such as output characteristics. The inventors then have succeeded in suppressing exothermic reactions while yielding satisfactory output characteristics by providing a highly heat-conductive thin film layer (intermediate layer) containing a flame retardant between a positive electrode current collector and a positive electrode mix layer. Because the intermediate layer is provided, heat generated at the internal short-circuited site efficiently diffuses through the intermediate layer and thermal decomposition of the flame retardant suppresses heat generated in the event of abnormality. Adding a flame retardant to a positive electrode mix layer increases the internal resistance of the electrode and decreases output characteristics (refer to Comparative Example 3 below); however, according to the nonaqueous electrolyte secondary battery of the present disclosure, heat generation in the event of abnormality can be suppressed while obtaining good output characteristics since the flame retardant is added to the intermediate layer adjacent to the positive electrode mix layer. Moreover, storage properties are expected to improve. Since the intermediate layer can rapidly diffuse the heat generated locally and releases the heat, exothermic reactions can be suppressed by use of a small amount of a flame retardant.

When a positive electrode current collector mainly composed of aluminum is used, a lithium-containing transition metal oxide, which is a positive electrode active material, and the current collector may undergo redox reactions in the event of internal short-circuiting, and a larger amount of heat may be generated. The intermediate layer disposed between the positive electrode current collector and the positive electrode mix layer also suppresses such redox reactions and decreases the amount of heat generated.

An exemplary embodiment will now be described in detail.

The drawings referred in the Detailed Description are schematic and the structural components in the drawings may be depicted at dimensional ratios different from those of actual apparatuses. Specific dimensional ratios and other features are to be understood from the description provided below.

FIG. 1 is a cross-sectional view of a nonaqueous electrolyte secondary battery 10 according to an exemplary embodiment.

The nonaqueous electrolyte secondary battery 10 includes a positive electrode 11, a negative electrode 12, and a nonaqueous electrolyte. A separator 13 is desirably disposed between the positive electrode 11 and the negative electrode 12. The nonaqueous electrolyte secondary battery 10 is obtained by, for example, placing into a battery case a nonaqueous electrolyte and a wound electrode assembly 14 prepared by winding the positive electrode 11, the negative electrode 12, and the separator 13 placed between the electrodes. The wound electrode assembly 14 may be replaced with some other type of electrode assembly, such as a laminated electrode assembly obtained by alternately stacking a positive electrode and a negative electrode with a separator interposed therebetween. Examples of the battery case that accommodates the electrode assembly 14 and the nonaqueous electrolyte include cylindrical, prismatic, coinshaped, and button-shaped metal cases, and resin cases (laminate-type batteries) formed by laminating resin sheets. In the example shown in FIG. 1, the battery case is constituted by a case main body 15 having a bottom and a cylindrical shape, and a sealing member 16.

The nonaqueous electrolyte secondary battery 10 includes insulating plates 17 and 18 respectively disposed on the top and at the bottom of the electrode assembly 14. In the example shown in FIG. 1, a positive electrode lead 19 attached to the positive electrode 11 extends through a penetrating hole in the insulating plate 17 and toward the sealing member 16. A negative electrode lead 20 attached to the negative electrode 12 runs on the outer side of the insulating plate 18 and extends toward the bottom of the case main body 15. For example, the positive electrode lead 19 is connected to a lower surface of a filter 22 which serves as a bottom plate of the sealing member 16 by welding, for example, and a cap 26 serving as a top plate of the sealing member 16 electrically connected to the filter 22 functions as a positive electrode terminal. The negative electrode lead 20 is connected to an inner surface of the bottom of the case main body 15 by welding, for example, and the case main body 15 functions as a negative electrode terminal. In this embodiment, a current interrupt device (CID) and a gas discharge mechanism (safety valve) are formed in the sealing member 16. Another gas discharge valve is desirably formed in the bottom of the case main body 15.

The case main body 15 is, for example, a metal container having a bottom and a cylindrical shape. A gasket 27 is disposed between the case main body 15 and the sealing member 16 to keep the interior of the battery case airtight. The case main body 15 desirably has a projecting portion 21 that is formed by, for example, pressing a portion of a side surface from outside and that supports the sealing member 16. The projecting portion 21 desirably has a ring shape that extends in the circumferential direction of the case main body 15, and supports the sealing member 16 at its upper surface.

The sealing member 16 includes the filter 22 having a filter opening 22a, and a valve member disposed on the filter 22. The valve member covers the filter opening 22a of the filter 22 and breaks once the inner pressure of the battery is increased by heat generated by internal short-circuiting or other phenomenon. In this embodiment, the valve member includes a lower valve member 23 and an upper valve member 25, an insulating member 24 disposed between the lower valve member 23 and the upper valve member 25, and the cap 26 having a cap opening 26a. Each of the components that constitute the sealing member 16 has a disk shape or a ring shape, and the components other than the insulating member 24 are electrically connected to one another. Specifically, the filter 22 and the lower valve member 23 are connected to each other at the rim portions thereof, and the upper valve member 25 and the cap 26 are connected to each other at the rim portions thereof. The lower valve member 23 and the upper valve member 25 are connected to each other at the central portions thereof, and the insulating member 24 is interposed between the rim portions of these valve members. When the inner pressure is increased by the heat generated by internal short-circuiting or other phenomenon, for example, the lower valve member 23 breaks at its thin part, the upper valve member 25 thereby bulges toward the cap 26 and separates from the lower valve member 23, and electrical connection therebetween is interrupted.

Positive Electrode

FIG. 2 is a cross-sectional view of a positive electrode 11 according to an exemplary embodiment.

The positive electrode 11 includes a positive electrode current collector 30, intermediate layers 32 formed on the positive electrode current collector 30, and positive electrode mix layers 31 formed on the intermediate layers 32. The positive electrode mix layers 31 contain a lithium-containing transition metal oxide as a positive electrode active material, and desirably further contains a conductive material and a binder. The positive electrode 11 can be prepared by, for example, applying onto a positive electrode current collector 30 with intermediate layers 32 formed thereon, a positive electrode mix slurry containing a positive electrode active material, a binder, and other components, drying the resulting coatings, and performing rolling so as to form the positive electrode mix layers 31 on both sides of the positive electrode current collector 30.

The positive electrode current collector 30 may be a foil of a metal, such as aluminum, that is stable within the potential range of the positive electrode 11, or a film coated with such a metal, for example. The positive electrode current collector 30 is, for example, a metal foil formed of aluminum or an aluminum alloy and has a thickness of about 10 μm to 50 μm.

Examples of the positive electrode active material include lithium-transition metal oxides containing transition metal elements such as Co, Mn, and Ni. The lithium-transition metal oxide is, for example, $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$, or $Li_2MPO_4F$ (M: at least one selected from Na, Mg, Sc, Y, Mn, Fe, Co, Ni, Cu, Zn, Al, Cr, Pb, Sb, and B, $0<x\le1.2$, $0<y\le0.9$, $2.0\le z\le2.3$). These may be used alone or as a mixture of two or more. The particle surfaces of the positive electrode active material may be coated with fine particles of an inorganic compound, such as an oxide, e.g., aluminum oxide ($Al_2O_3$), a phosphate compound, or a borate compound.

The conductive material contained in the positive electrode mix layers 31 is used to enhance electrical conductivity of the positive electrode mix layers 31. Examples of the conductive material include carbon materials such as carbon black (CB), acetylene black (AB), Ketjen black, and graphite. These may be used alone or in combination.

The binder contained in the positive electrode mix layers 31 maintains a satisfactory contact state between the positive electrode active material and the conductive material and strengthens the bond between the positive electrode active material and other components and the surfaces of the positive electrode current collector 30. Examples of the binder include fluorocarbon resins such as polytetrafluoroethylene (PTFE) and polyvinylidene fluoride (PVdF), polyacrylonitrile (PAN), polyimide resins, acrylic resins, and polyolefin resins. These resins may be used in combination with carboxymethyl cellulose (CMC) or a salt thereof (CMC-Na, CMC-K, CMC-$NH_4$, or the like which may be a partially neutralized salt), polyethylene oxide (PEO), or the like. These may be used alone or in combination.

The intermediate layers 32 contain a highly heat conductive material having a heat conductivity of 10 W/m·K or more and a flame retardant. The intermediate layers 32 diffuse heat generated locally at the internal short-circuited site in the positive electrode 11 and suppresses continuation of the exothermic reactions. Continuation of the exothermic reactions of the battery is suppressed as the flame retardant in the intermediate layers 32 is thermally decomposed. Since the flame retardant is contained in the intermediate layers 32 in contact with the positive electrode mix layers 31 and not in the positive electrode mix layers 31 of the positive electrode 11, a battery that uses this positive electrode is less likely to generate heat in the event of internal short-circuiting, for example, and exhibits good output characteristics and storage properties.

The intermediate layers 32 desirably contain a binder in addition to the highly heat conductive material and the flame retardant in order for the intermediate layers 32 to obtain mechanical strength and exhibit increased adhesiveness to the positive electrode current collector 30. If a highly heat conductive material having low electrical conductivity is used, the intermediate layers 32 desirably contains a conductive material.

The thickness of each of the intermediate layers 32 is desirably 1 µm to 5 µm and more desirably 1.5 µm to 3.5 µm. The intermediate layers 32 formed on the positive electrode current collector 30 desirably each have a coating amount of 1 $g/m^2$ to 15 $g/m^2$. When the thickness and the coating amount of the intermediate layers 32 are within these ranges, the amount of heat generated in the event of abnormality can be easily decreased without degrading battery performance. The intermediate layers 32 can be formed by, for example, applying a slurry containing a highly heat conductive material, a flame retardant, and a binder to the positive electrode current collector 30, and drying the resulting coatings. When positive electrode mix layers 31 are to be formed on both sides of the positive electrode current collector 30, t is also desirable to form intermediate layers 32 on both sides of the positive electrode current collector 30.

The highly heat conductive material may be any material having a heat conductivity of 10 W/m·K or more but is desirably at least one selected from diamond, graphite, aluminum nitride (AlN), silicon carbide (SiC), aluminum oxide ($Al_2O_3$), and tungsten oxide ($WO_2$). Among these, diamond (for example, heat conductivity: 2200 W/m·K), graphite (for example, heat conductivity: 150 W/m·K), AlN (for example, heat conductivity: 230 W/m·K), SiC (for example, heat conductivity: 270 W/m·K), and $Al_2O_3$ (for example, heat conductivity: 20 W/m·K) are desirable. Considering the availability of the materials as well as battery characteristics, graphite, SiC, or $Al_2O_3$ is more desirably used as a main component.

The highly heat conductive material is, for example, particles having an average particle diameter of 0.1 to 10 µm. The average particle diameter is desirably 0.5 to 5 µm and more desirably 0.7 to 2 µm. The average particle diameter of the highly heat conductive material is a particle diameter (volume-average particle diameter) at which the integrated volume value is 50% in a particle size distribution measured by a laser diffraction scattering method (for example, measured with LA-750 produced by HORIBA Ltd.). The highly heat conductive material content relative to the total weight of the intermediate layers 32 is desirably 50% by weight or more, more desirably 70% to 95% by weight, and most desirably 75% to 90% by weight. When the highly heat conductive material content is within this range, for example, satisfactory adhesion can be easily obtained between the intermediate layers 32 and the positive electrode current collector 30 and heat can be efficiently released from the short-circuited site.

The flame retardant is, for example, a granular substance sparingly soluble in nonaqueous electrolyte solutions, and suppresses the chain reaction between the positive electrode active material and the nonaqueous electrolyte solution caused by Joule heat generated at the internal short-circuited site. According to the nonaqueous electrolyte secondary battery of this embodiment, a flame retardant is desirably added to the intermediate layers 32 only and not contained in the positive electrode mix layers 31 or the electrolyte solution. The flame retardant may be any material having this reaction suppressing function discussed above. Examples of the flame retardant include aromatic phosphate esters such as triphenyl phosphate (TPP), tricresyl phosphate (TCP), trixylenyl phosphate(TXP), cresyl diphenyl phosphate (CDP), 2-ethyl hexyl diphenyl phosphate (EHDP), tert-butyl phenyl diphenyl phosphate (t-BDP), bis-(tert-butylphenyl)phenyl phosphate (BBDP), tris-(tert-butylphenyl) phosphate (TBDP), isopropylphenyl diphenyl phosphate (IPP), bis-(isopropylphenyl)diphenyl phosphate (BIPP), and tris-(isopropylphenyl) phosphate (TIPP), and melamine-acid salts such as melamine pyrophosphate, melamine sulfate, melamine polyphosphate, melamine cyanurate, and melamine borate. These may be used alone or in combination.

The flame retardant is desirably at least one selected from an aromatic phosphate ester and a melamine-acid salt. The flame retardant content relative to the total weight of the intermediate layers 32 is desirably 1% by weight or more, more desirably 5% to 70% by weight, and most desirably 10% to 50% by weight. When the flame retardant content is within this range, adhesion between the intermediate layers 32 and the positive electrode current collector 30 is improved, and heat generation in the event of abnormality can be easily suppressed, for example.

The flame retardant is desirably contained at a ratio of 0.5% to 3% by weight relative to the weight of the positive electrode active material per unit area. The ratio is more desirably 0.5% to 2% by weight. That is, the positive electrode 11 contains 0.5 to 3 parts by weight of the flame retardant per 100 parts by weight of the positive electrode active material per unit area of the electrode plate. When the flame retardant is added in such a ratio, heat generation in the event of abnormality can be efficiently decreased.

The conductive material contained in the intermediate layers 32 may be the same as the conductive material used in the positive electrode mix layers 31. For example, carbon materials such as carbon black (CB), acetylene black (AB), Ketjen black, and graphite can be used alone or in combination. When a conductive material is to be added, the conductive material content relative to the total weight of the intermediate layers 32 is desirably 1% to 20% by weight and more desirably 3% to 10% by weight.

The binder contained in the intermediate layers 32 may be the same as the binder used in the positive electrode mix layers 31. For example, fluorocarbon resins such as polytetrafluoroethylene (PTFE) and polyvinylidene fluoride (PVdF), polyacrylonitrile (PAN), polyimide resins, acrylic resins, and polyolefins resins may be used alone or in combination. When a binder is to be added, the binder content relative to the total weight of the intermediate layers 32 is desirably 0.1% to 10% by weight and more desirably 1% to 5% by weight.

Negative Electrode

A negative electrode is constituted by a negative electrode current collector formed of, for example, a metal foil, and negative electrode mix layers formed on the current collector. Examples of the negative electrode current collector include a foil of a metal, such as copper, that is stable within the potential range of the negative electrode, and a film coated with such a metal. The negative electrode mix layers desirably contain a binder in addition to the negative electrode active material. The negative electrode can be prepared by, for example, applying a negative electrode mix slurry containing a negative electrode active material, a binder, and other suitable additives to a negative electrode current collector, drying the resulting coatings, and performing rolling so that negative electrode mix layers are formed on both sides of the current collector.

The negative electrode active material may be any material that can reversibly store and release lithium ions. Examples thereof include carbon materials such as natural graphite and artificial graphite, metals, such as silicon (Si) and tin (Sn), that alloy with lithium, and alloys and composite oxides containing metal elements such as Si and Sn. These negative electrode active materials can be used alone or in combination.

As in the case of the positive electrode, fluorocarbon resins, PAN, polyimide resins, acrylic resins, polyolefin resins, and the like can be used as the binder to be contained in the negative electrode mix layers. In the case where a negative electrode mix slurry is prepared by using an aqueous solvent, the binder is desirably styrene-butadiene rubber (SBR), CMC or a salt thereof, polyacrylic acid (PAA) or a salt thereof (for example, PAA-Na, PAA-K, or a partially neutralized salt thereof), or a polyvinyl alcohol (PVA), for example.

Separator

A porous sheet having ion permeability and an insulating property is used as a separator. Specific examples of the porous sheet include a microporous thin membrane, woven cloth, and non-woven cloth. The material of the separator is desirably an olefin resin such as polyethylene or polypropylene, or a cellulose, for example. The separator may be a multilayer sheet constituted by a cellulose fiber layer and a thermoplastic resin fiber layer made of an olefin resin or the like. The separator may be a multilayer separator including a polyethylene layer and a polypropylene layer or a separator coated with an aramid resin or the like.

A filler layer containing an inorganic filler may be formed on at least one interface selected from a separator-positive electrode interface and a separator-negative electrode interface. An example of the inorganic filler is an oxide or phosphate compound that contains at least one selected from titanium (Ti), aluminum (Al), silicon (Si), and magnesium (Mg). The filler layer can be formed by, for example, applying a slurry containing the filler to surfaces of the positive electrode, the negative electrode, or the separator.

Nonaqueous Electrolyte

The nonaqueous electrolyte contains a nonaqueous solvent and an electrolyte salt dissolved in the nonaqueous solvent. The nonaqueous electrolyte is not limited to a liquid electrolyte (nonaqueous electrolyte solution) and may be a solid electrolyte that uses a gel polymer or the like. Examples of the nonaqueous solvent include esters, ethers, nitriles such as acetonitrile, amides such as dimethylformamide, and mixed solvents containing two or more selected from the foregoing. The nonaqueous solvent may contain a halogen-substituted product obtained by substituting at least some of hydrogen atoms in the solvent with halogen atoms such as fluorine atoms.

Examples of the esters include cyclic carbonate esters such as ethylene carbonate (EC), propylene carbonate (PC), and butylene carbonate, linear carbonate esters such as dimethyl carbonate (DMC), methyl ethyl carbonate (EMC), diethyl carbonate (DEC), methyl propyl carbonate, ethyl propyl carbonate, and methyl isopropyl carbonate, cyclic carboxylate esters such as y-butyrolactone and y-valerolactone, and linear carboxylate esters such as methyl acetate, ethyl acetate, propyl acetate, methyl propionate (MP), and ethyl propionate.

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ethers; and linear ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxy toluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

Examples of the halogen-substituted product include fluorinated cyclic carbonate esters such as fluoroethylene carbonate (FEC), fluorinated linear carbonate esters, and fluorinated linear carboxylate esters such as methyl fluoropropionate (FMP).

The electrolyte salt is desirably a lithium salt. Examples of the lithium salt include $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$, $LiPF_{6-x}(C_nF_{2n+1})_x$ (where $1<x<6$, $n=1$ or 2), $LiB_{10}Cl_{10}$, $LiCl$, $LiBr$, $LiI$, chloroboranelithium, lithium lower aliphatic carboxylate, borates such as $Li_2B_4O_7$ and $Li(B(C_2O_4)F_2)$, and imide salts such as $LiN(SO_2CF_3)_2$ and $LiN(C_lF_{2l+1}SO_2)(C_mF_{2m+1}SO_2)$ (where l and m each represent an integer of 1 or more). Lithium salts may be used alone or in combination as a mixture. Among these lithium salts, $LiPF_6$ is desirably used from the viewpoints of ion conductivity and electrochemical stability, for example. The lithium salt concentration is desirably 0.8 to 1.8 mol per liter of the nonaqueous solvent.

EXAMPLES

The present disclosure will now be described in further detail through Examples below which do not limit the scope of the disclosure.

Example 1

Preparation of Positive Electrode

Graphite (average particle size: 3 μm, heat conductivity: 100 W/m·K) in an amount of 62.3 parts by weight, 31.2 parts by weight of melamine polyphosphate, 5 parts by weight of acetylene black (AB), and 1.5 parts by weight of polyvinylidene fluoride (PVdF) were mixed, and an appropriate amount of N-methyl-2-pyrrolidone (NMP) was added to the resulting mixture to prepare a slurry. The slurry was applied to both sides of a positive electrode current collector formed of an aluminum foil 15 μm in thickness and the resulting coatings were dried to form intermediate layers each having a thickness of 4 μm and a coating amount of 4.08 g/m² (graphite: 2.54 g/m², melamine polyphosphate: 1.27 g/m²).

A lithium-containing transition metal oxide represented by $LiNi_{0.5}Co_{0.2}Mn_{0.3}O_2$ serving as a positive electrode active material in an amount of 97 parts by weight, 2 parts by weight of acetylene black (AB), and 1 part by weight of polyvinylidene fluoride (PVdF) were mixed, and an appropriate amount of N-methyl-2-pyrrolidone (NMP) was added to the resulting mixture to prepare a positive electrode mix slurry. The positive electrode mix slurry was applied to intermediate layers on both sides of the positive electrode current collector, and the resulting coatings were dried. The resulting product was cut into a predetermined electrode size and rolled with rollers. As a result, a positive electrode having an intermediate layer and a positive electrode mix layer sequentially stacked on each side of a positive electrode current collector was formed. The ratio of melamine polyphosphate in the intermediate layers relative to the weight (100% by weight) of the positive electrode active material per unit area was 0.6% by weight in this positive electrode.

Preparation of Negative Electrode

Graphite powder in an amount of 98.7 parts by weight, 0.7 part by weight of carboxymethyl cellulose (CMC), and 0.6 part by weight of styrene-butadiene rubber (SBR) were mixed, and an appropriate amount of water was added to the resulting mixture to prepare a negative electrode mix slurry. The negative electrode mix slurry was applied to both sides of a negative electrode current collector formed of a copper foil, and the resulting coatings were dried. The resulting product was cut into a predetermined electrode size and rolled with rollers. As a result, a negative electrode having a negative electrode mix layer formed on each side of the negative electrode current collector was obtained.

Preparation of Nonaqueous Electrolyte

Ethylene carbonate (EC), ethyl methyl carbonate (EMC), and dimethyl carbonate (DMC) were mixed at a volume ratio of 3:3:4. Into the resulting mixed solvent, $LiPF_6$ was dissolved so that the concentration was 1.2 mol/L to prepare a nonaqueous electrolyte.

Preparation of Battery

An aluminum lead was attached to the positive electrode, and a nickel lead was attached to the negative electrode. The positive electrode and the negative electrode were superimposed on each other with a separator therebetween, and wound to form a wound electrode assembly. The electrode assembly was placed in a bottomed cylindrical battery case main body having an outer diameter of 18.2 mm and a height of 65 mm. The nonaqueous electrolyte was poured into the batter case main body and the opening of the battery case main body was sealed with a gasket and a sealing member to obtain a 18650-type cylindrical nonaqueous electrolyte secondary battery A1.

Example 2

A battery A2 was prepared as in Example 1 except that 46.8 parts by weight of SiC (average particle diameter: 1 μm, heat conductivity: 260 W/m·K), 46.7 parts by weight of melamine cyanurate, 5 parts by weight of acetylene black (AB), and 1.5 parts by weight of polyvinylidene fluoride (PVdF) were used instead of graphite and melamine polyphosphate.

The intermediate layers of the positive electrode in the battery A2 had a thickness of 3 μm and a coating amount of 4.77 g/m$^2$ (graphite: 2.23 g/m$^2$, melamine cyanurate: 2.23 g/m$^2$). In this positive electrode, the ratio of the melamine cyanurate in the intermediate layers relative to the weight of the positive electrode active material per unit area was 1.1% by weight.

Example 3

A battery A3 was prepared as in Example 1, except that 28.3 parts by weight of $Al_2O_3$ (average particle diameter: 0.7 μm, heat conductivity: 20 W/m·K), 10 parts by weight of acetylene black (AB), and 5 parts by weight of polyvinylidene fluoride (PVdF) were used instead of graphite and the amount of melamine polyphosphate used was changed to 56.7 parts by weight.

The intermediate layers of the positive electrode in the battery A3 had a thickness of 4 μm and a coating amount of 6.37 g/m$^2$ ($Al_2O_3$: 1.80 g/m$^2$, melamine polyphosphate: 3.61 g/m2). In this positive electrode, the ratio of the melamine polyphosphate in the intermediate layers relative to the weight of the positive electrode active material per unit area was 1.8% by weight.

Comparative Example 1

A battery B1 was prepared as in Example 1 except that no intermediate layers were formed.

Comparative Example 2

A battery B2 was prepared as in Example 1 except that no melamine polyphosphate was added to the intermediate layers.

Comparative Example 3

A battery B3 was prepared as in Example 1 except that no intermediate layers were formed and 3% by weight of melamine polyphosphate relative to the positive electrode active material was added to the positive electrode active material layers.

Measurement of DC Resistance

DC resistance of each of the batteries described above was measured as follows. The results are shown in Table.

In a 25° C. environment, each battery was charged at a constant current of 0.3 lt (600 mA) until the battery voltage was 4.35 V and then charging was continued at a constant voltage until the current value was 0.05 lt (90 mA). Then the battery was discharged at a constant current of 0.3 lt (600 mA) for 1 hour and 40 minutes to prepare a battery with a SOC of 50%. The voltage data was acquired from each battery by applying a discharge current of 0 A, 0.1 A, 0.5A, and 1.0 A each for 10 seconds. The voltage value after the 10 seconds relative to the discharge current value applied was linearly approximated by a least squares method to obtain a slope and the DC current value was calculated from the absolute value of the slope.

Nail Penetration Test

Each battery was subjected to a test according to the following procedure. The results are shown in Table.

(1) In a 25° C. environment, a battery was charged at a constant current of 0.3 It (600 mA) until the battery voltage was 4.35 V, and then charging was continued at a constant voltage until the current value was 0.05 lt (90 mA).

(2) In a 25° C. environment, the tip of a wire nail 3 mm in diameter was brought into contact with a central portion of a side surface of the battery charged in (1), and the wire nail was penetrated into the battery at a rate of 10 mm/sec in a radial direction of the battery. Penetration of the wire nail was stopped the moment the wire nail completely penetrated through the battery.

(3) The temperature of the bottom (negative electrode side) of the battery case main body having a bottom and a cylindrical shape was measured, and the highest attainment temperature was determined.

TABLE

| Battery | Intermediate layers | | | | Results | |
| --- | --- | --- | --- | --- | --- | --- |
| | Highly heat conductive material | Coating amount (g/m²) | Flame retardant | Coating amount (g/m²) | DC resistance (mΩ) | Nail penetration temperature (° C.) |
| B1 | — | — | — | — | 27.1 | 630 |
| B2 | Graphite | 4.08 | — | — | 27.2 | 599 |
| B3 | — | — | (Added to mix layers) | — | 34.4 | 548 |
| A1 | Graphite | 2.54 | Melamine polyphosphate | 1.27 | 27.2 | 536 |
| A2 | SiC | 2.23 | Melamine cyanurate | 2.23 | 27.4 | 554 |
| A3 | Al₂O₃ | 1.98 | Melamine polyphosphate | 3.97 | 28.0 | 540 |

The results in Table show that all of the batteries A1 to A3 according to Examples had low highest attainment temperature in the nail penetration test compared to the batteries B1 and B2 of Comparative Examples. The battery B3 having positive electrode mix layers containing melamine polyphosphate had low highest attainment temperature compared to the batteries B1 and B2 but had high internal resistance and degraded output characteristics. The batteries A1 to A3 suppress heat generation in the event of internal short-circuiting without degrading output characteristics.

What is claimed is:

1. A nonaqueous electrolyte secondary battery comprising:
   a positive electrode;
   a negative electrode; and
   a nonaqueous electrolyte,
   wherein the positive electrode includes
      a positive electrode current collector,
      an intermediate layer on the positive electrode current collector, the intermediate layer containing a flame retardant and a heat conductive material having a heat conductivity of 10 W/m·K or more, and
      a positive electrode mix layer on the intermediate layer.

2. The nonaqueous electrolyte secondary battery according to claim 1, wherein the heat conductive material is at least one selected from the group consisting of diamond, graphite, aluminum nitride, silicon carbide, aluminum oxide, and tungsten oxide.

3. The nonaqueous electrolyte secondary battery according to claim 1, wherein the flame retardant is at least one selected from the group consisting of an aromatic phosphate ester and a melamine-acid salt.

4. The nonaqueous electrolyte secondary battery according to claim 1, wherein the flame retardant is contained in a ratio of 0.5% to 3% by weight relative to a weight of a positive electrode active material per unit area.

5. The nonaqueous electrolyte secondary battery according to claim 1, wherein the flame retardant is contained in a ratio of 1% to 70% by weight relative to a weight of the intermediate layer.

6. The nonaqueous electrolyte secondary battery according to claim 1, wherein the heat conductive material contains graphite and aluminum oxide.

* * * * *